(12) United States Patent
Bhoja et al.

(10) Patent No.: US 9,467,231 B2
(45) Date of Patent: *Oct. 11, 2016

(54) METHOD AND SYSTEM FOR TRANSMITTER OPTIMIZATION OF AN OPTICAL PAM SERDES BASED ON RECEIVER FEEDBACK

(71) Applicant: INPHI CORPORATION, Santa Clara, CA (US)

(72) Inventors: Sudeep Bhoja, San Jose, CA (US); Chao Xu, Thousand Oaks, CA (US); Hari Shankar, Westlake Village, CA (US)

(73) Assignee: INPHI CORPORATION, Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/599,833

(22) Filed: Jan. 19, 2015

(65) Prior Publication Data
US 2015/0171963 A1 Jun. 18, 2015

Related U.S. Application Data

(63) Continuation of application No. 13/802,275, filed on Mar. 13, 2013, now Pat. No. 9,197,324, and a continuation-in-part of application No. 13/791,201, filed on Mar. 8, 2013, now Pat. No. 9,020,346.

(60) Provisional application No. 61/621,920, filed on Apr. 9, 2012, provisional application No. 61/714,543, filed on Oct. 16, 2012, provisional application No. 61/699,724, filed on Sep. 11, 2012.

(51) Int. Cl.
*H04B 10/50* (2013.01)
*H04B 10/27* (2013.01)
*H04B 10/2575* (2013.01)
*H04B 10/40* (2013.01)
*H04B 10/69* (2013.01)

(52) U.S. Cl.
CPC .......... *H04B 10/27* (2013.01); *H04B 10/2575* (2013.01); *H04B 10/40* (2013.01); *H04B 10/50* (2013.01); *H04B 10/695* (2013.01)

(58) Field of Classification Search
CPC .................. H04B 10/2575; H04B 10/695
USPC .................... 398/45, 43, 115, 116
See application file for complete search history.

(56) References Cited

U.S. PATENT DOCUMENTS

| | | | | |
|---|---|---|---|---|
| 6,826,372 B1 * | 11/2004 | Givehchi | .............. | H04L 25/063 398/209 |
| 7,113,708 B1 * | 9/2006 | Creaney | .............. | H04L 25/4917 398/140 |
| 7,389,046 B1 * | 6/2008 | Tanaka | ................ | H04J 14/0283 398/45 |
| 7,734,191 B1 * | 6/2010 | Welch | .................... | B82Y 20/00 398/158 |
| 7,941,053 B2 * | 5/2011 | Dallesasse | ............. | H04B 10/40 398/135 |
| 8,103,137 B2 * | 1/2012 | Kirkpatrick | ........ | H04Q 11/0005 385/17 |

(Continued)

*Primary Examiner* — Oommen Jacob
(74) *Attorney, Agent, or Firm* — Richard T. Ogawa; Ogawa P.C.

(57) ABSTRACT

The present invention is directed to data communication system and methods. More specifically, various embodiments of the present invention provide a communication interface that is configured to transfer data at high bandwidth using PAM format(s) over optical communication networks. A feedback mechanism is provided for adjusting the transmission power levels. There are other embodiments as well.

24 Claims, 7 Drawing Sheets

(56) References Cited

U.S. PATENT DOCUMENTS

| | | | | |
|---|---|---|---|---|
| 8,406,128 B1* | 3/2013 | Brar | ............... | H04L 49/15 370/229 |
| 9,197,324 B1* | 11/2015 | Bhoja | ............... | H04B 10/2575 |
| 2002/0166091 A1* | 11/2002 | Kidorf | ............... | H03M 13/151 714/752 |
| 2003/0223762 A1* | 12/2003 | Ho | ............... | H04B 10/541 398/186 |
| 2004/0037569 A1* | 2/2004 | Kamalov | ......... | H04B 10/07953 398/162 |
| 2005/0123295 A1* | 6/2005 | Hullin | ............... | H04J 14/0221 398/25 |
| 2008/0069570 A1* | 3/2008 | Dallesasse | ............ | H04B 10/40 398/139 |
| 2009/0154500 A1* | 6/2009 | Diab | ............... | H04L 12/40032 370/477 |
| 2009/0269055 A1* | 10/2009 | Butler | ............... | H04J 14/0221 398/27 |
| 2009/0297148 A1* | 12/2009 | Webb | ............... | H04J 14/0221 398/79 |
| 2010/0008662 A1* | 1/2010 | Bradbeer | ........... | H04B 10/0799 398/25 |
| 2010/0254703 A1* | 10/2010 | Kirkpatrick | ........ | H04Q 11/0005 398/45 |
| 2011/0236017 A1* | 9/2011 | Ohlen | ............... | H04J 14/0282 398/34 |
| 2011/0236028 A1* | 9/2011 | Liu | ............... | H01S 5/0683 398/136 |
| 2013/0004161 A1* | 1/2013 | Xia | ............... | H04Q 11/0067 398/25 |
| 2013/0156425 A1* | 6/2013 | Kirkpatrick | ........ | H04B 10/801 398/45 |

* cited by examiner

METHOD AND SYSTEM FOR TRANSMITTER OPTIMIZATION OF AN OPTICAL PAM SERDES BASED ON RECEIVER FEEDBACK

CROSS-REFERENCES TO RELATED APPLICATIONS

This patent application claims priority to and is a continuation of U.S. patent application Ser. No. 13/802,275, filed on Mar. 13, 2013, which claims priority to U.S. Provisional patent application Ser. No. 61/621,920, filed Apr. 9, 2012, entitled "Method and System for transmitter optimization of an optical PAM Serdes based on Receiver feedback", and is a continuation-in-part (CIP) application of U.S. patent application Ser. No. 13/791,201, filed 8 Mar. 2013, titled "OPTICAL COMMUNICATION INTERFACE UTILIZING CODED PULSE AMPLITUDE MODULATION", which claims priority from U.S. Provisional Patent Application No. 61/714,543, filed 16 Oct. 2012, titled "100G PAM CODED MODULATION", and U.S. Provisional Patent Application No. 61/699,724, titled "ADAPTIVE ECC FOR FLASH MEMORY", each of which are incorporated by reference herein for all purposes.

BACKGROUND OF THE INVENTION

The present invention is directed to data communication systems and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication system and methods. More specifically, various embodiments of the present invention provide a communication interface that is configured to transfer data at high bandwidth using PAM format(s) over optical communication networks. A feedback mechanism is provided for adjusting the transmission power levels. There are other embodiments as well.

It is to be appreciated that by using a feedback loop, the optimal power levels for data transmission can be determined, used, and updated, thereby allowing high data transmission rate and low error rate. Various embodiments of the present invention can be implemented with existing systems. For example, determination of power transmission levels and threshold levels can be performed by existing logic units and/or processors. There are other benefits as well.

DETAILED DESCRIPTION OF THE INVENTION

The present invention is directed to data communication system and methods. More specifically, various embodiments of the present invention provide a communication interface that is configured to transfer data at high bandwidth using PAM format(s) over optical communication networks. A feedback mechanism is provided for adjusting the transmission power levels. There are other embodiments as well.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12 PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35, U.S.C. 112 Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
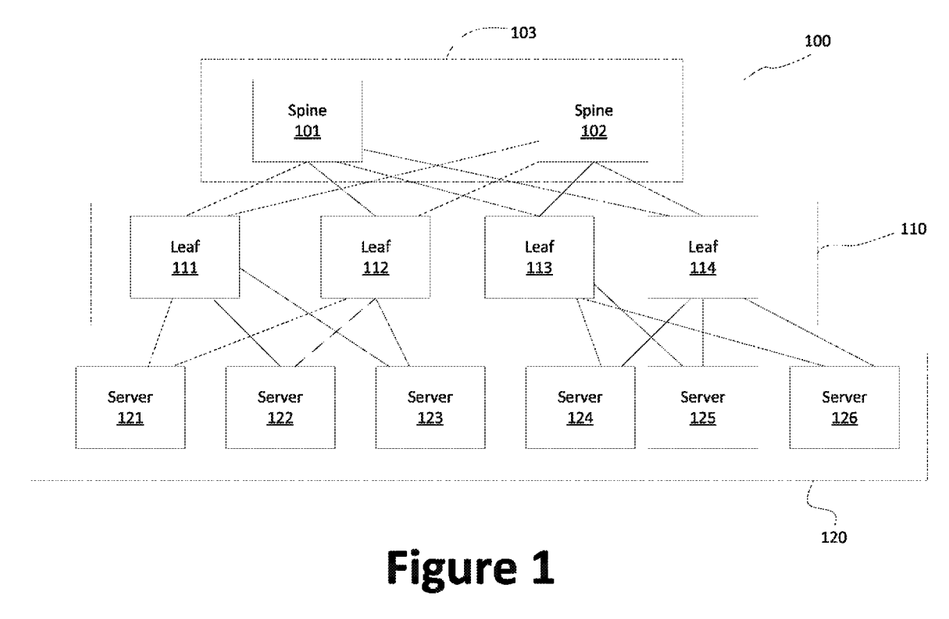
FIG. 1 is a simplified diagram illustrating a leaf-spine architecture 100 according to an embodiment of the present invention.

FIG. 1 is a simplified diagram illustrating a leaf-spine architecture 100 according to an embodiment of the present invention. This diagram is merely an example, which should not unduly limit the scope of the claims. One of ordinary skill in the art would recognize many variations, alternatives, and modifications. The leaf-spine architecture 100 comprises servers 120, leaf switches 110, and spine switches 103. It is to be appreciated that depending on the need and specific application, the number and arrangement of the servers and switches may be changed. As shown in FIG. 1, each server may be connected to more than one leaf switch. For example, server 121 is connected to leaf switches 111 and 112. Similarly, server 122 is connected to leaf switches 111 and 112, and so is server 123. In an exemplary embodiment, server 121 is connected to the leaf switch 111 via optical communication link utilizing pulse amplitude modulation (PAM). PAM2, PAM4, PAM8, PAM12, PAM16, and/or other variations of PAM may also be used in conjunction with optical communication links in various embodiments of the present invention. The bandwidth of the optical communication link between the server 121 and leaf switch 111 can be over 10 gigabits/s. Each leaf switch, such as leaf switch 111, may be connected to 10 or more servers. In one implementation, a leaf switch has a bandwidth of at least 100 gigabits/s.

In a specific embodiment, a leaf switch comprises a receiver device configured to receive four communication channels, and each of the channels is capable of transferring incoming data at 25 gigabits/s and configured as a PAM-2 format. Similarly, a server (e.g. server 121) comprises communication interface that is configured to transmit and receive at 100 gigabits/sec (e.g., four channels at 25 gigabits/s per channel), and is compatible with the communication interface of the leaf switches. The spine switches, similarly, comprise communication interfaces for transmitting and receiving data in PAM format. The spine switches may have a large number of communication channels to accommodate a large number of leaf switches, each of which provides switching for a large number of servers.

The leaf switches are connected to spine switches. As shown in FIG. 1, each leaf switch is connected to spine switches 101 and 102. For example, leaf switch 111 is connected to the spine switch 101 and 102, and so are leaf switches 113 and 114. In a specific embodiment, each of the spine switches is configured with a bandwidth of 3.2 terabytes/s, which is big enough to communicate 32 optical communication links at 100 gigabits/s each. Depending on the specific implementation, other configuration and bandwidth are possible as well.

The servers, through the architecture 100 shown in FIG. 1, can communicate with one another efficiently with a high bandwidth. Optical communication links are used between servers and leaf switches, and also between leaf switches and spine switches, and PAM utilized for optical network communication.

Figure 2:
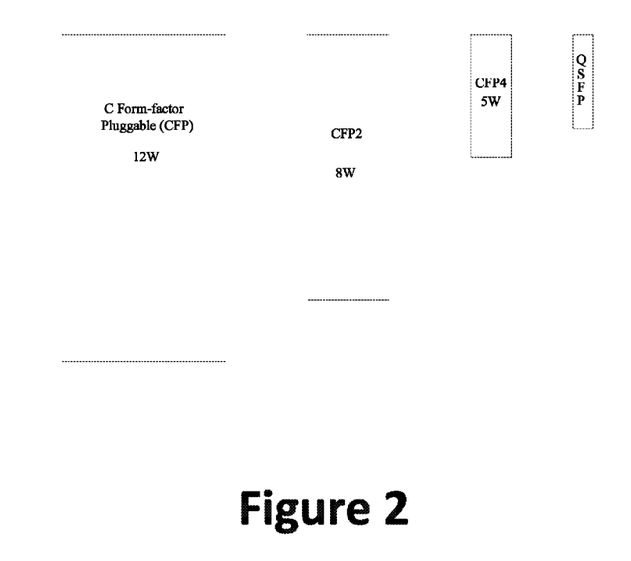
FIG. 2 is a simplified diagram illustrating the form factor of a communication device according to an embodiment of the present invention.

It is to be appreciated that the PAM communication interfaces described above can be implemented in accordance with today communication standards form factors. In addition, afforded by high efficiency level, network transceivers according to embodiments of the present invention can have much lower power consumption and smaller form factor compared to conventional devices. FIG. 2 is a simplified diagram illustrating the form factor of a communication device according to an embodiment of the present invention. Today, C form-factor pluggable (CFP) standard is widely adapted for gigabit network systems. Conventional electrical-connection based CFP transceivers often use 10×10 gigabits/s lines to achieve high bandwidth. With optical connection, CFP transceivers can utilize 10×10 gigabits/s configuration, 4×25 gigabits/s configuration, or others. It is to be appreciated that by utilizing optical communication link and PAM format, a transceiver according to the present invention can have a much smaller form factor than CFP and CFP2 as shown. In various embodiments, communication interfaces according to the invention can have a form factor of CFP4 or QSFP, which are much smaller in size than the CFP. In addition to smaller form factors, the power consumption of communication interfaces according to the present invention can be much smaller. In a specific embodiment, with the form factor of QSFP, the power consumption can be as low as about 3W, which is about ¼ that of convention transceivers with CFP form factor. The reduce level of power consumption helps save energy at data centers, where thousands (sometimes millions) of these communication devices are deployed.

Figure 3A:
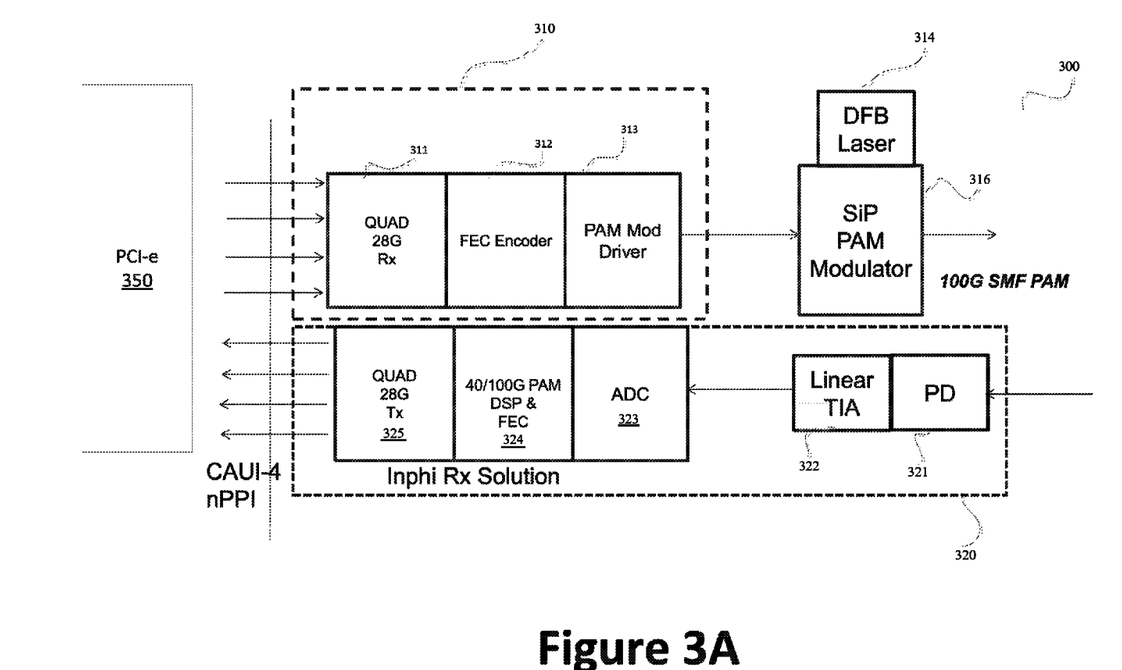
FIG. 3A is a simplified diagram illustrating a communication interface 300 according to an embodiment of the present invention.

FIG. 3A is a simplified diagram illustrating a communication interface 300 according to an embodiment of the present invention. This diagram is merely an example, which should not unduly limit the scope of the claims. One of ordinary skill in the art would recognize many variations, alternatives, and modifications. The communication interface 300 includes transmitter module 310 and a receiver module 320. The transmitter module 310 comprises a receiver 311, encoder 312, and PAM modulation driver 313.

In an embodiment, the communication interface 300 is configured to receive incoming data at through four channels, where each channel is configured at 25 gigabits/s and configured as a PAM-2 format. Using the transmitter module 310, modulator 316, and the laser 314, the communication interface 300 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter module 310 receives 4 channels of data. It is to be appreciated that other variants of pulse-amplitude modulation (e.g., PAM4, PAM8, PAM12, PAM16, etc.), in addition to PAM-2 format, may be used as well. The transmitter module 310 comprises functional block 311, which includes a clock data recovery (CDR) circuit configured to receive the incoming data from the four communication channels. In various embodiments, the functional block 311 further comprises multiplexer for combining 4 channels for data. For example, data from the 4 channels as shown are from the PCE-e interface 350. For example, the interface 350 is connected to one or more processors. In a specific embodiment, two 2:1 multiplexers are employed in the functional block 311. For example, the data received from the four channels are high-speed data streams that are not accompanied by clock signals. The receiver 311 comprises, among other things, a clock signal that is associated with a predetermined frequency reference value. In various embodiments, the receiver 311 is configured to utilize a phase-locked loop (PLL) to align the received data.

The transmitter module 310 further comprises an encoder 312. As shown in FIG. 3, the encoder 312 comprises a forward error correction (FEC) encoder. Among other things, the encoder 312 provides error detection and/or correction as needed. For example, the data received is in a PAM-2 format as described above. The received data comprises redundancy (e.g., one or more redundant bits) helps the encoder 312 to detect errors. In a specific embodiment, low-density parity check (LDPC) codes are used. The encoder 312 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format. The PAM formats as used in the embodiments of the present invention are further described below.

The PAM modulation driver 313 is configured to drive data stream encoded by the encoder 312. In various embodiments, the receiver 311, encoder 312, and the modulation driver 313 are integrated and part of the transmitter module 310.

The PAM modulator 316 is configured to modulate signals from the transmitter module 310, and convert the received electrical signal to optical signal using the laser 314. For example, the modulator 316 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM12, PAM 16, etc.). In various embodiments, the laser 314 comprises a distributed feedback (DFB) laser. Depending on the application, other types of laser technology may be used as well, as such vertical cavity surface emitting laser (VCSEL) and others.

Figure 3B:
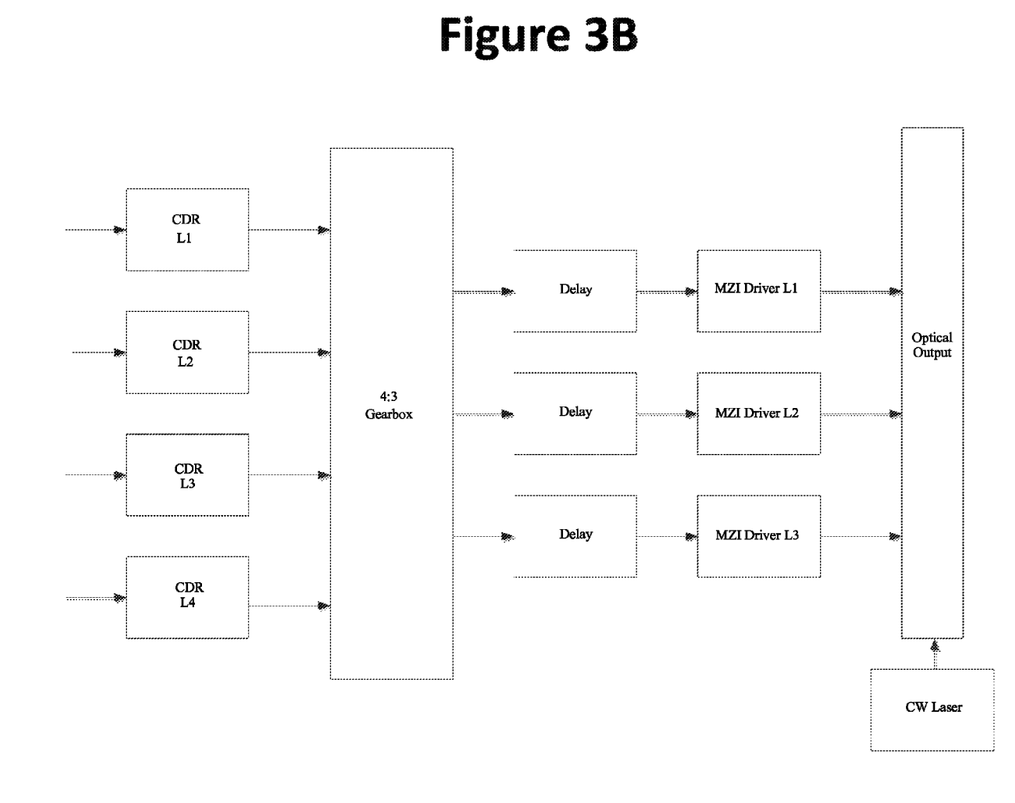
FIG. 3B is a simplified diagram illustrating a segmented optical modulator according to an embodiment of the present invention.

FIG. 3B is a simplified diagram illustrating a segmented optical modulator according to an embodiment of the present invention. This diagram is merely an example, which should not unduly limit the scope of the claims. One of ordinary skill in the art would recognize many variations, alternatives, and modifications. For example, modulated PAM signals modulated for transmission over optical communication links.

Now referring back to FIG. 3A. The communication interface 300 is configured for both receiving and transmitting signals. A receiver module 320 comprise a photo detector 321 that converts incoming data signal in an optical format converts the optical signal to an electrical signal. In various embodiments, the photo detector 321 comprises indium gallium arsenide material. For example, the photo detector 321 can be a semiconductor-based photodiode, such as p-n photodiodes, p-i-n photodiodes, avalanche photodiodes, or others. The photo detector 321 is coupled with an amplifier 322. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 322 also includes a limiting amplifier. The amplifier 322 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 322 is processed by the analog to digital converter (ADC) 323. In a specific embodiment, the ADC 323 can be a baud rate ADC. For example, the ADC is configured to convert the amplified signal into a digital signal formatted into a 100 gigabit per second signal in a PAM format. The functional block 324 is configured to process the 100 Gb/s data stream and encode it into four at streams at 25 Gb/s each. For example, the incoming optical data stream received by the photo detector 321 is in PAM-8 format at a bandwidth of 100 Gb/s, and at block 324 four data streams in PAM-2 format is generated at a bandwidth of 25 Gb/s. The four data streams are transmitted by the transmitter 325 over 4 communication channels at 25 Gb/s.

It is to be appreciated that there can be many variations to the embodiments described in FIG. 3. For example, different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

Figure 4:
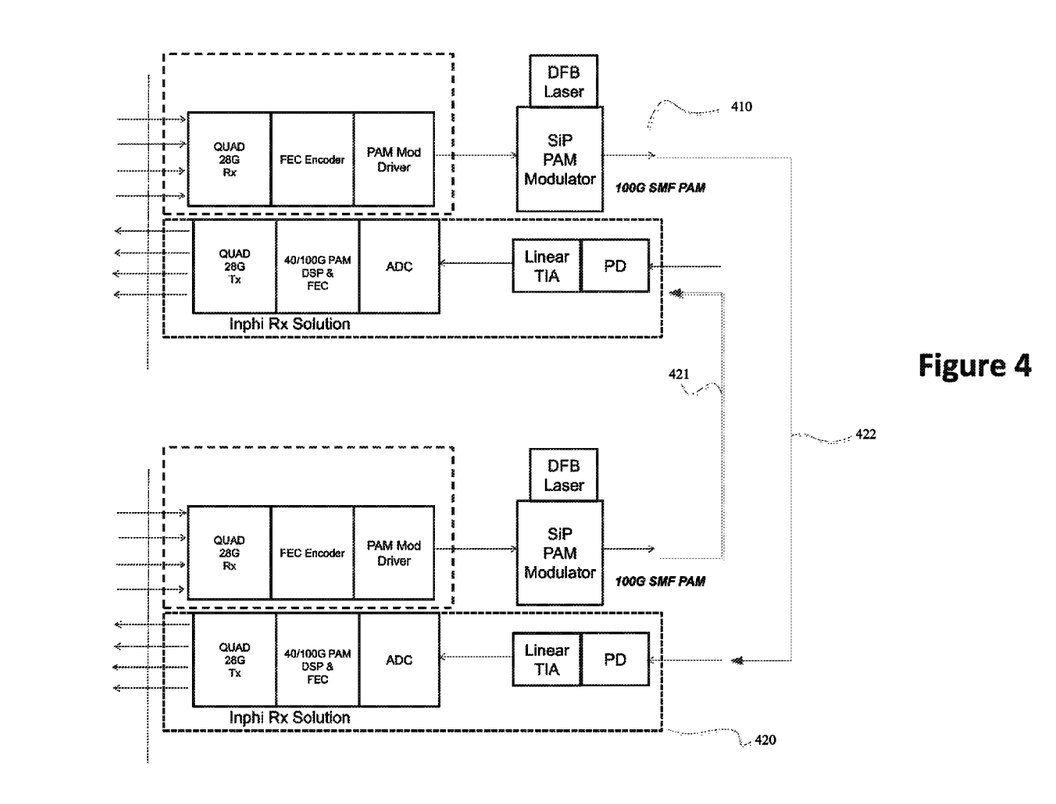
FIG. 4 is a simplified diagram illustrating a feedback mechanism according an embodiment of the invention.

In operation, the communication interface 300 send optical signal to another communication interface. More specifically, the transmitter module of one network interface sends signals over optical network to the receiver module of another network interface. FIG. 4 is a simplified diagram illustrating a feedback mechanism according an embodiment of the invention. This diagram is merely an example, which should not unduly limit the scope of the claims. One of ordinary skill in the art would recognize many variations, alternatives, and modifications. As shown in FIG. 4, the communication interface 410 is linked to and communicates with the communication interface 410. For example, the communication interface 410 transmits data from its PAM modulator, through the optimal communication link 422, and to the network interface 420. The network interface 420 processes the signal received from the communication interface 410, and based on the received signal, determines an optimal power level for communication between the two communication interfaces 410 and 420. The network interface 420 sends, using its own PAM modulator and other components, the information regarding the optimal power level to the communication interface 410 via the optical communication link 421.

In various embodiments, the network interface 420 comprises a processor units that processes the receive the signal to analysis the characteristics of optical transmission power and the noise thereof. For example, optical signal from the communication interface 410 is processed by the photodiode of the communication interface 420 and converted from optical signal to electrical signal. The characteristics of optical transmission power and the noise thereof are analyzed by the processor unit of the network interface 420. The processor unit determines the optimal power level for data transmitted from network interface 410 through the optical communication 422. The information related to the optimal power level is transmitted from encoded by the FEC encoder and transmitted through the PAM modulator of the network interface 420 to the network interface 410 via the optical communication link 421. Detailed description for determining the optimal power level is described in more details below.

In communications systems where the noise is not dependent upon the signal level, the transmitter power levels are equispaced (i.e., spaced apart at equal distances) and the receiver threshold levels are set at the middle of two power levels. In the case of binary level optical communication systems (e.g., PAM optical transmission), where the noise is transmitted with signal, the receiver threshold level is set away from the midpoint. Typically, in optimal PAM communication, the noise is often signal dependent, which means that transmission power levels should not be equispaced.

Figure 5:
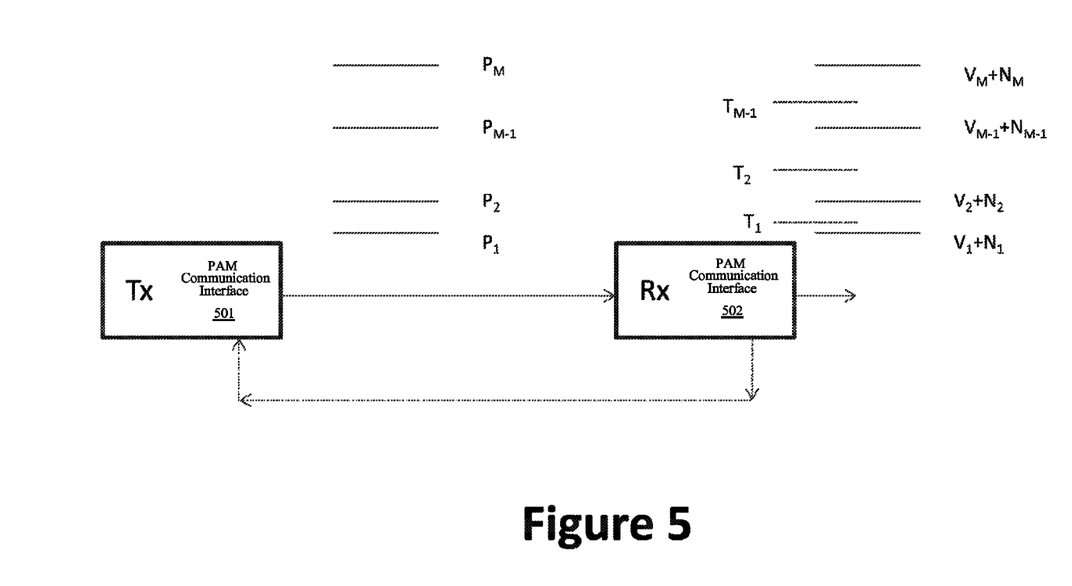
FIG. 5 is a simplified diagram illustrating the relationship between signal and noise according to an embodiment of the present invention.

FIG. 5 is a simplified diagram illustrating the relationship between signal and noise according to an embodiment of the present invention. This diagram is merely an example, which should not unduly limit the scope of the claims. One of ordinary skill in the art would recognize many variations, alternatives, and modifications. As shown in FIG. 5, the PAM optical communication interface 501 sends signals at M power levels, from $P_1$ to $P_M$. Transmitted over optical communication link(s), signals is received by the communication interface 502. In various embodiments, the received signal is converted from optical signal to electrical signal by a photodiode, and then amplified by a TIA. The inputs received by the communication interface 502 comprise both signals V and noise M. For example, at different power levels, the inputs at different power levels are $V_1+N_1$ to $V_M+N_M$. It is to be appreciated that when transmitting signals over optical communication links, not only is power levels are selected, but the power levels are actually set. With the power levels that are set by the feedback system, the transmitter has optimized power levels to select from.

FIG. 5 shows that the capacity achieving measures can be a function of the signal dependence of the noise. For example, it can be seen that distance between neighboring levels increases when the noise is more dependent on the signal and that the distance between the levels is smaller for lower signal levels. For example, the difference of power level between $V_M+N_M$ and $V_{M-1}+N_{M-1}$ is greater than the difference of power levels between $V_2+N_2$ and $V_1+N_1$.

In various embodiment, a way of adjusting the power levels can be achieved at the receiver for a given set of receiver threshold levels. These transmission power levels can then be sent back to the transmitter. After the transmit level are changed, the receiver then re-adjusts it threshold levels and once again computes the optimal transmission power levels for this set of receiver parameters. In this way the feedback loop can be adjusted.

It is to be appreciated that methods for calculating the optimal receiver thresholds for a given set of transmitter levels and noise is given in the equations, which are provided below. Similarly, a method for calculating the optimal transmitter power levels for a given set of receiver thresholds and noise is also provided. In these equations it is assumed that the noise has 3, components: (1) a signal independent component, (2) a component proportional to the signal power, and (3) a component proportional to the square of the signal power. The components of noise are attributed to the source or cause of noise, such as the present of short noise and laser intensity noise (RIN). For example, instead of explicitly calculating the levels, the equations can be used to compute a gradient method of adjusting the receiver and transmitter parameters to optimize the system.

Now referring back to FIG. 5. For receiver power levels from $V_1+N_1$ to $V_M+N_M$, receiver threshold levels $T_1$ to $T_{M-1}$ are set between input levels. For transmission performance, it is needed to determine transmission power levels and the receiver threshold levels to minimize transmission errors. As boundary conditions, the transmission levels $P_1$ and $P_M$ are set by the ratio of the transmitter and the maximum laser power available at the transmitter.

A received input $V_k+N_k$ has a signal component $V_k$ and noise component $N_k$. The signal component $V_k$ received at the receiving end is proportional to the signal recovered optical power $P_k$:

$$V_k \propto P_k, k=1, \ldots, M$$

The noise at the receiving end, as described above, has three components: : (1) a signal independent component, (2) a component proportional to the signal power, and (3) a component proportional to the square of the signal power, which can be expressed as follows:

$$\sigma_{Nk}^2 = \sigma_{TIA}^2 + \sigma_{Sh,k}^2 + \sigma_{RINk}^2$$

Where: $\sigma_{RINk}^2 = \beta P_k^2$
$\sigma_{Sh,k}^2 = \gamma P_k$
$\sigma_{TIA}^2 = \delta$ The noise associated with the laser intensity noise (RIN) is proportional to the square of the optical power. The shot noise ($\sigma_{Sh,k}$) is proportional to the optical power. The TIA noise is independent of the of the optical power. As modeled, these noise components are independent from one another, and the variance is added. For the purpose of modeling, these three components are assumed to be Gaussian.

The probability of error $P_e$, from the transmission can be calculated as:

$$P_e = \frac{1}{M} \sum_{k=1}^{M-1} \frac{1}{\gamma}\left(f\left(\frac{V_{k+1}-T_k}{\sqrt{2}\,\sigma_{k+1}}\right) + f\left(\frac{T_k-V_k}{\sqrt{2}\,\sigma_k}\right)\right) \quad \text{(Equation 1)}$$

$$\text{where: } f(x) = \frac{2}{\sqrt{\pi}} \int_x^\infty e^{-t^2} dt \quad \text{(Equation 2)}$$

$$\text{hence: } \frac{df(x)}{dx} = \frac{-2}{\sqrt{\pi}} e^{-x^2} \quad \text{(Equation 3)}$$

For optimal transmission power levels, the optimal threshold values need to be determined. More specifically, for a given set of transmission power levels, $P_1, \ldots, P_m$, the threshold levels $T_1, \ldots, T_{M-1}$ are to be determined, where the probably of error $P_e$ is minimized:

$$\frac{\partial P_e}{\partial T_l} = 0, l = 1, \ldots, M-1 \quad \text{(Equation 4)}$$

$$\frac{1}{2M}\left(\frac{\partial}{\partial T_l}f\left(\frac{V_{l+1} - T_l}{\sqrt{2}\,\sigma_{l+1}}\right) + \frac{\partial}{\partial T_l}f\left(\frac{T_l - V_l}{\sqrt{2}\,\sigma_l}\right)\right) = 0$$

$$\frac{-2}{\sqrt{\pi}}\left(e^{-\left(\frac{V_{l+1}-T_l}{\sqrt{2}\sigma_{l+1}}\right)^2}\frac{(-1)}{\sqrt{2}\,\sigma_{l+1}} + e^{-\left(\frac{T_l-V_l}{\sqrt{2}\sigma_l}\right)^2}\frac{(-1)}{\sqrt{2}\,\sigma_l}\right) = 0$$

$$\left(\frac{V_{l+1} - T_l}{\sqrt{2}\,\sigma_{l+1}}\right)^2 + \ln(\sigma_{l+1}) = \left(\frac{T_l - V_l}{\sqrt{2}\,\sigma_l}\right)^2 + \ln(\sigma_l)$$

The threshold levels $T_l$, $l=1, \ldots, M-1$ are obtained by solving the equation above.

By approximation where $\ln(\sigma_{l+1}) \cong \ln(\sigma_l)$, the following approximation can be obtained:

$$\left(\frac{V_{l+1} - T_l}{\sqrt{2}\,\sigma_{l+1}}\right)^2 = \left(\frac{T_l - V_l}{\sqrt{2}\,\sigma_l}\right)^2 \quad \text{(Equation 5)}$$

$$\text{Or } T_l \cong \frac{\sigma_l V_{l+1} + \sigma_{l+1} V_l}{\sigma_{l+1} + \sigma_l}$$

For a given set of receiver threshold levels, $T_1, \ldots, T_{M-1}$, the transmission power levels are adjusted to minimized the system probability of error, or $P_e$. To minimize $P_e$, the following equation is used:

$$\frac{\partial P_e}{\partial P_l} = 0, l = 2, \ldots, M-1 \quad \text{(Equation 6)}$$

$$\frac{1}{2M}\left(\frac{\partial}{\partial P_l}f\left(\frac{T_l - V_l}{\sqrt{2}\,\sigma_l}\right) + \frac{\partial}{\partial P_l}f\left(\frac{V_l - T_{l-1}}{\sqrt{2}\,\sigma_l}\right)\right) = 0$$

$$\frac{-2}{\sqrt{\pi}}\left(\begin{array}{l}e^{-\left(\frac{T_l-V_l}{\sqrt{2}\sigma_l}\right)^2}\frac{\partial}{\partial P_l}\left(\frac{T_l - V_l}{\sqrt{2}\,\sigma_l}\right) + \\ e^{-\left(\frac{V_l-T_{l-1}}{\sqrt{2}\sigma_l}\right)^2}\frac{\partial}{\partial P_l}\left(\frac{V_l - T_{l-1}}{\sqrt{2}\,\sigma_l}\right)\end{array}\right) = 0$$

$$\frac{\partial}{\partial P_l}\left(\frac{T_l - V_l}{\sqrt{2}\,\sigma_l}\right) = \frac{\partial}{\partial P_l}\left(\frac{T_l - \gamma P_l}{\sqrt{\beta P_l^2 + \gamma P_l + \delta}}\right) = \quad \text{(Equation 7)}$$

$$\frac{\sqrt{\beta P_l^2 + \gamma P_l + \delta}\,(-\gamma) - \frac{(T_l - \gamma P_l)(2\beta P_l + \gamma)}{2\sqrt{\beta P_l^2 + \gamma P_l + \delta}}}{\beta P_l^2 + \gamma P_l + \delta} = 0$$

and $$\frac{\partial}{\partial P_l}\left(\frac{V_l - T_{l-1}}{\sigma_l}\right) = \frac{\partial}{\partial P_l}\left(\frac{\gamma P_l - T_{l-1}}{\sqrt{\beta P_l^2 + \gamma P_l + \delta}}\right) = \quad \text{(Equation 8)}$$

$$\frac{\sqrt{\beta P_l^2 + \gamma P_l + \delta}(\gamma) - \frac{(\gamma P_l - T_{l-1})(2\beta P_l + \gamma)}{2\sqrt{\beta P_l^2 + \gamma P_l + \delta}}}{\beta P_l^2 + \gamma P_l + \delta} = 0$$

By substituting Equations 7 and 8 into Equation 6, Equation 9 below is obtained:

$$e^{-\left(\frac{T_l - \gamma P_l}{\sqrt{2}\sigma_l}\right)^2}\left(\begin{array}{l}(\beta P_l^2 + \gamma P_l + \delta)(-\gamma) - \\ \frac{(T_l - \gamma P_l)(2\beta P_l + \gamma)}{2}\end{array}\right) + \quad \text{(Equation 9)}$$

$$e^{-\left(\frac{\gamma P_l - T_{l-1}}{\sqrt{2}\sigma_l}\right)^2}\left(\begin{array}{l}(\beta P_l^2 + \gamma P_l + \delta)(\gamma) - \\ (\gamma P_l - T_{l-1})(2\beta P_l + \gamma)\end{array}\right) = 0$$

Equation 9 is solved for $l=2, \ldots M-1$, given $T_1, \ldots, T_{l-1}$, for transmission power levels $P_2, \ldots P_{M-1}$, to minimize the probably of transmission error.

Figure 6:
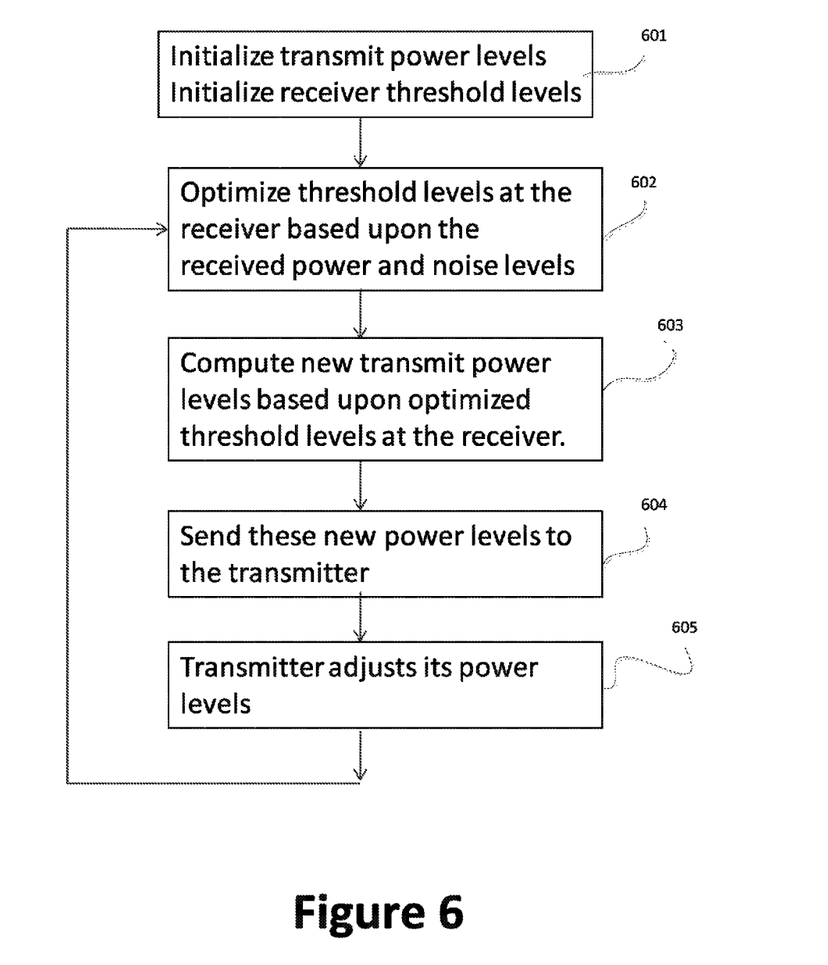
FIG. 6 is a simplified flow diagram illustrating a process for adjusting transmission power levels according to an embodiment of the present invention.

To apply the equations above, the feedback loop described above is used for adjusting transmission power levels. FIG. 6 is a simplified flow diagram illustrating a process for adjusting transmission power levels according to an embodiment of the present invention. This diagram is merely an example, which should not unduly limit the scope of the claims. One of ordinary skill in the art would recognize many variations, alternatives, and modifications. For example, one or more steps may be added, removed, replaced, repeated, modified, rearranged, and/or repeated.

At step 601, the transmission power levels and threshold levels are initialized. For example, network interfaces (e.g., network interfaces 410 and 420) have a set of predetermined transmission power levels and threshold levels. Depending on the actual application, the transmission power levels and threshold level may or may not be reset or initialized at each start up.

At step 602, threshold levels at the receiving network interface are optimized based on the received power and noise levels. For example, the network interface 420 receives transmissions from the network interface 430. After processing the transmission is received by the network interface 420 (e.g., converted from optical signal to electrical signal by photodiode), the signal power level and the noise level are determined and used to optimize threshold levels, which are stored at the network interface 420. For example, the optimized threshold levels are determined by using equations explained above, which take, among other things, three noise components, into account.

At step 603, the receiving network interface computes new transmission power levels to be used by the transmitting network interface. The computation of transmission power levels is based at least on the threshold levels. For example, the relationship between the transmission power level and the threshold levels are described above.

At step 604, the receiving network interface (e.g., network interface 420) sends transmission power levels to the transmitting network interface (e.g., network interface 410). For example, the transmission power level information is encoded and transmitted by the receiving network interface over optical communication links.

At step 605, the transmission power levels are received by the transmitting network interface, which adjusts its transmission power levels continues. For example, the transmitting network interface 410 in FIG. 4 adjusts its transmission power levels using the transmission power level information received from the network interface 420.

In various embodiments, the network interfaces that communicate with one another update the transmission power levels more than once during operation. More specifically, the receiving network interface continues to optimize threshold levels based on the signal and noise levels of the received transmissions. For example, the receiving network interface periodically updates the threshold level. In certain embodiments, the receiving network interface updates threshold level when a substantial change in transmission power and noise levels is detected. The update of threshold levels can be triggered by other events as well. For example, after step 605, the processes loops back to step 602 so that the transmission levels can be adjusted and optimized as needed.

It is to be appreciated that by using a feedback loop, the optimal power levels for data transmission can be determined, used, and updated, thereby allowing high data transmission rate and low error rate. Various embodiments of the present invention can be implemented with existing systems. For example, determination of power transmission levels and threshold levels can be performed by existing logic units and/or processors. There are other benefits as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A data communication system, the system comprising: a network interface device comprising:
   a first optical communication interface configured to receive an optical signal transmission transmitted over an optical communication link, the optical signal transmission being characterized by a signal level and a noise level, the optical signal transmission being received from a transmitter device;
   a photodiode configured to convert the optical signal transmission to an electrical signal transmission;
   a TIA configured to amplify the electrical signal transmission;
   a processor configured to calculate a set of threshold levels based on at least the signal level and the noise level, the processor being configured to generate a set of power transmission levels for the transmitter device, the power transmission levels being based on at least one of the threshold levels, the power transmission levels being non-equispaced;
   an encoder for encoding the power transmission levels;
   a second optical communication interface for sending the encoded power transmission levels to the transmitter device; and
   a leaf spine network architecture comprising a top of a rack switch.

2. The system of claim 1 further comprising an analog to digital converter for converting electrical amplified electrical transmission to digital signals.

3. The system of claim 1 further comprising a PAM modulation driver for driving the encoded power transmission levels.

4. The system of claim 1 further comprising a laser for driving output signals.

5. The system of claim 1 wherein the transmitter device adjust transmission power levels for sending data to the network interface based on the encoded power transmission power level.

6. The system of claim 1 wherein the noise level includes a signal independent component, a component proportional to the signal power, and a component proportional to the square of the signal power.

7. The system of claim 1 wherein the threshold levels are initialized at a start stage.

8. The system of claim 1 wherein the power transmission levels are initialized at a start stage.

9. The system of claim 1 further comprising a PAM driver configured to drive the encoded power transmission levels.

10. The system of claim 1 wherein the first optical communication interface is part of a spine switch of the leaf-spine network architecture.

11. The system of claim 1 wherein the first optical communication interface is part of a leaf switch of the leaf-spine network architecture.

12. The system of claim 1 wherein the first optical communication interface is part of a server of the leaf-spine network architecture.

13. The system of claim 1 further comprising a Phase Lock Loop (PLL).

14. The system of claim 13 wherein the PLL is configured to perform clock recovery from data.

15. The system of claim 1 wherein the TIA further includes a limiting amplifier.

16. The system of claim 1 wherein the TIA is configured to perform electrical dispersion compensation.

17. The system of claim 1 further comprising a functional block configured to perform error correction.

18. The system of claim 17 wherein the error correction comprises Forward Error Correction (FEC).

19. The system of claim 1 further comprising an Analog to Digital Converter.

20. The system of claim 1 wherein the photodiode comprises a semiconductor-based photodiode.

21. The system of claim 1 wherein the system is provided in a cloud computing center.

22. The system of claim 1 wherein the system is provided in a data center.

23. The system of claim 1 further comprising a plurality of non-blocking spine switches.

24. The system of claim 1 further comprising a plurality of server nodes coupled to each other.

* * * * *